United States Patent [19]

Roose

[11] Patent Number: 5,032,717
[45] Date of Patent: Jul. 16, 1991

[54] REMOTE CONTROL FOR ANODE-CATHODE ADJUSTMENT

[75] Inventor: Lars D. Roose, Albuquerque, N. Mex.

[73] Assignee: The United States of America as represented by the United States Department of Energy, Washington, D.C.

[21] Appl. No.: 417,110

[22] Filed: Oct. 4, 1989

[51] Int. Cl.$^5$ .............................................. H01J 5/16
[52] U.S. Cl. .................................. 250/227.11; 313/146
[58] Field of Search ................. 313/146, 152; 250/551, 250/227.11

[56] References Cited

U.S. PATENT DOCUMENTS

| | | | |
|---|---|---|---|
| 2,992,361 | 7/1961 | Rychlik | 313/152 |
| 3,767,922 | 10/1973 | Towlson | 313/146 |
| 4,310,754 | 1/1982 | Check | 250/551 |
| 4,866,330 | 9/1989 | Lacruche et al. | 313/146 |

*Primary Examiner*—David C. Nelms
*Attorney, Agent, or Firm*—Karla Ojanen; James H. Chafin; William R. Moser

[57] ABSTRACT

An apparatus for remotely adjusting the anode-cathode gap in a pulse power machine has an electric motor located within a hollow cathode inside the vacuum chamber of the pulse power machine. Input information for controlling the motor for adjusting the anode-cathode gap is fed into the apparatus using optical waveguides. The motor, controlled by the input information, drives a worm gear that moves a cathode tip. When the motor drives in one rotational direction, the cathode is moved toward the anode and the size of the anode-cathode gap is diminished. When the motor drives in the other direction, the cathode is moved away from the anode and the size of the anode-cathode gap is increased. The motor is powered by batteries housed in the hollow cathode. The batteries may be rechargeable, and they may be recharged by a photovoltaic cell in combination with an optical waveguide that receives recharging energy from outside the hollow cathode. Alternatively, the anode-cathode gap can be remotely adjusted by a manually-turned handle connected to mechanical linkage which is connected to a jack assembly. The jack assembly converts rotational motion of the handle and mechanical linkage to linear motion of the cathode moving toward or away from the anode.

18 Claims, 3 Drawing Sheets

REMOTE CONTROL FOR ANODE-CATHODE ADJUSTMENT

The United States Government has rights in this invention pursuant to Contract No. DE-AC04-76DP00789 between the United States Department of Energy and AT&T Technologies, Inc.

BACKGROUND OF THE INVENTION

The present invention relates to the field of pulse power machines for generating strong electromagnetic pulses, and more particularly to an apparatus for adjusting the size of the anode-cathode gap in a pulse power machine.

In the art of pulse power machines, the anode-cathode gap must be adjusted at times. In the pulse power machine, the anode-cathode gap is located in a vacuum chamber, and the vacuum chamber must be disassembled in order to effect a change in the anode-cathode gap. Disassembly of the vacuum chamber is undesirable because it is time consuming and labor intensive. Of course after the anode-cathode gap has been adjusted, the vacuum chamber must be reassembled and reevacuated. It would be desirable, therefore, to provide an adjustable anode-cathode gap for a pulse power machine that does not require disassembly of the vacuum chamber.

The environment of the vacuum chamber of a pulse power machine is permeated with pulsed electromagnetic energy during use of the machine. Consequently, any device that would be used for adjusting the anode-cathode gap should be protected from the electromagnetic energy of the pulse power machine.

SUMMARY OF THE INVENTION

Accordingly, it is a primary object of the present invention to provide an adjustable anode-cathode gap for a pulse power machine that does not require disassembly of the vacuum chamber in order to bring about an adjustment of the anode-cathode gap.

Another object of the invention is to provide means for adjusting the anode-cathode gap in a pulse power machine that is protected from the electromagnetic energy of the pulse power machine.

Additional objects, advantages, and novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved apparatus is provided for adjusting an anode-cathode gap in a pulse power machine in which the anode and cathode are housed in a chamber (such as a vacuum chamber) defined by chamber walls. The apparatus provides for remotely adjusting the anode-cathode gap. That is, the anode-cathode gap inside the chamber is controlled remotely from outside the chamber.

More specifically, the apparatus includes means, inside the chamber, for adjusting the anode-cathode gap. Other means are connected to the anode-cathode gap adjusting means for conveying control input from outside the chamber, through a chamber wall, to the anode-cathode gap adjusting means inside the chamber. Also, there are means, outside the chamber, in communication with the control input conveying means, for applying control input to the input conveying means and thus to the anode-cathode gap adjusting means.

The control input may be in the form of optical signals. Alternatively, the control input may be in the form of mechanical movement, applied either by machine or manually.

More specifically, the anode-cathode gap adjusting means includes a holder for a cathode tip and a movable support for supporting the cathode tip holder. The support is capable of moving the cathode tip toward or away from the anode thereby adjusting the anode-cathode gap. A hollow cathode is provided which includes one end adapted to receive the movable support. The hollow cathode is supported inside the chamber. An electric motor and associated control circuitry is also housed within the hollow cathode for moving the movable support. The motor and associated circuitry is in communication with the control input conveying means. A power source, such as batteries, is housed within the hollow cathode for powering the motor.

The hollow cathode, with the electrical components housed therein, serves to shield the electrical components from electromagnetic pulse energy.

The apparatus also may include means for conveying information about the status of the anode-cathode gap inside the chamber to an operator outside the chamber. In this way, the status of the anode-cathode gap can be monitored.

To prevent unwanted electromagnetic pulse energy from electrically discharging or arcing inside or outside the chamber, electrical conductors are not employed to interface the operator, who stands outside the vacuum chamber, with the means for adjusting the anode-cathode gap that is located inside the vacuum chamber. Instead, optical waveguides are used to convey control signals into the chamber and to convey information about the status of the anode-cathode gap outside the chamber.

Still other objects of the present invention will become readily apparent to those skilled in this art from the following description, wherein there is shown and described a preferred embodiment of this invention. Simply by way of illustration, the invention will be set forth in part in the description that follows and in part will become apparent to those skilled in the art upon examination of the following or may be learned with the practice of the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
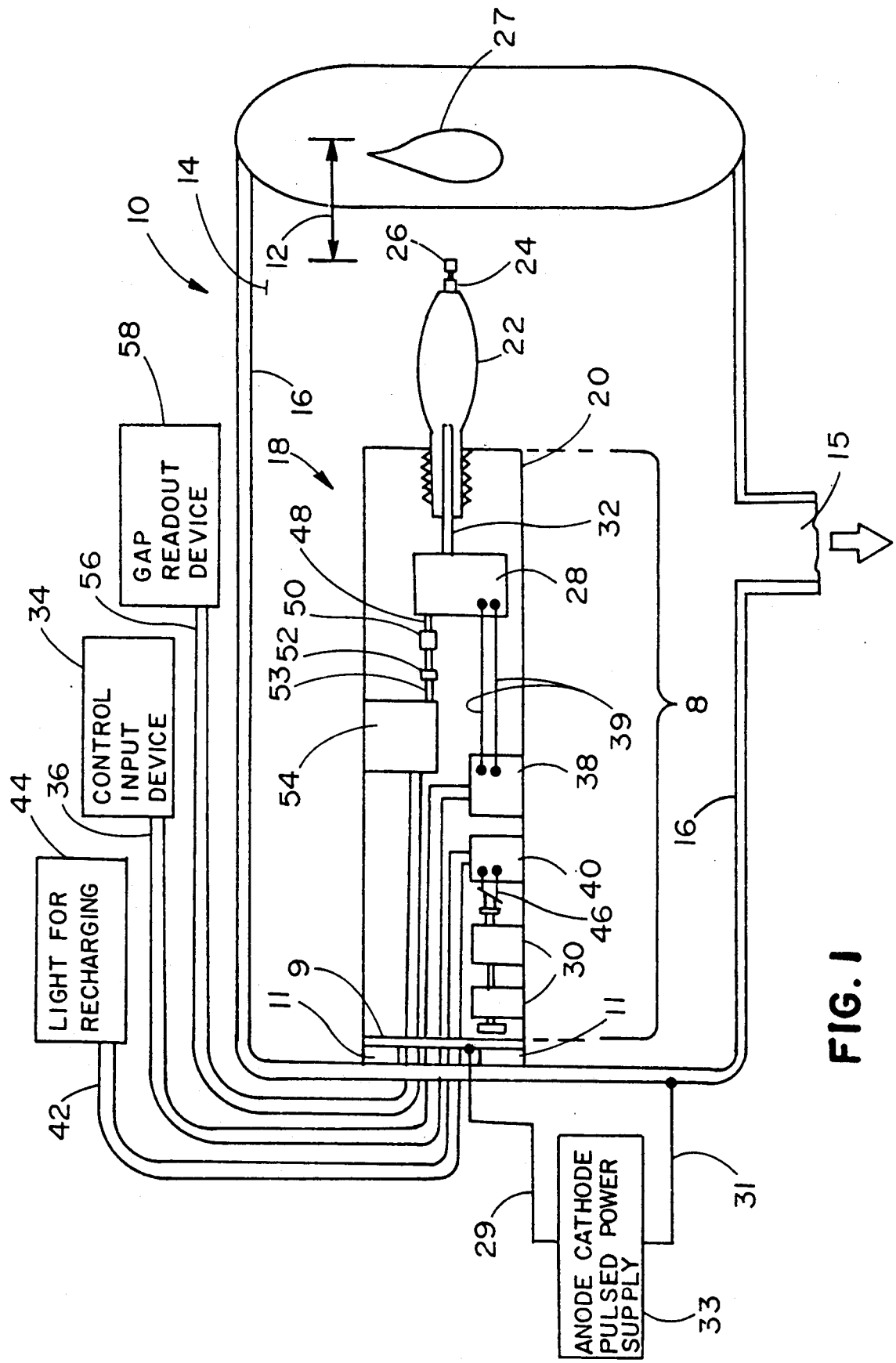
FIG. 1 is a schematic drawing of an embodiment of the invention in which an electric motor, housed in a hollow cathode, is used for adjusting the anode-cathode gap of a pulse power machine.

With reference to the drawings, and more particularly to FIG. 1, there is disclosed an embodiment of the apparatus 10 of the invention for remotely controlling an anode-cathode gap 12 in the vacuum chamber 14 of a pulse power machine which may be an accelerator. The vacuum is obtained in the chamber 14 by connecting the chamber 14 to a vacuum pump (not shown) through an orifice 15 in a wall of the chamber. The vacuum chamber 14 has a plurality of walls, one of which is wall 16, and another of which is wall insulation ring 11. Supported on wall insulation ring 11 is a hollow cathode 18, whereby hollow cathode 18 is electrically insulated from wall 16. The hollow cathode 18 has a closed end 20 which has threads adapted to receive complementary threads on the outside of an extended cathode element 22 which supports a cathode tip holder 24 and a cathode tip 26 held by the tip holder 24.

Within the hollow cathode 18, means are provided for adjusting the anode-cathode gap 12; that is, means are provided for moving the extended cathode element 22 and its cathode tip 26 either closer to or farther away from anode 27 to alter the anode-cathode gap 12. More specifically, an electric DC motor 28 is powered by batteries 30 through electrical conductors (not shown), through a photovoltaic array 38, and through conductors 39. The character of the controlling light that enters the photovoltaic array 38 determines the polarity of the DC voltage that is supplied to the DC motor 28. The polarity of the voltage applied to the motor 28 determines the direction that the motor 28 turns; and the direction that the motor 28 turns determines whether the size of the anode-cathode gap 12 is diminished or increased.

The motor 28 turns a worm gear 32 that is engaged with complementary threads 20 internal to the extended cathode element 22 which is prevented from unwanted rotation by appropriate keys and slots (not shown). The motor 28 is fixed inside hollow cathode 18. Thus, when the motor drives the worm gear 32, the extended cathode element 22 is longitudinally driven by the motor 28 along the axis of the worm gear 32.

Electrical conductors 31 and 29 are simple representations of the pulse power electrical feed to the anode and cathode, respectively, from the anode-cathode pulse power supply 33 which is also a simple representation. Wall insulation ring 11 is interposed between chamber wall 16 and the base 9 of cathode shaft assembly 8, whereby the cathode shaft assembly 8 is effectively electrically insulated from anode 27 and wall 16.

Control of the motor 28 begins with optical control input signals generated by electrical-signal-to-optical-signal converter 34 (referred to as a control input device) located outside the vacuum chamber 14. Optical signals from the control input device 34 enter a pair of optical waveguides 36 (shown in greater detail as waveguides 36a and 36b in FIG. 2) which pass through the cathode base 9 and enter the hollow cathode 18. Optical waveguides 36 are interfaced with optical-signal-to-electrical-signal converter 38 (referred to as a photodiode array shown in greater detail in FIG. 2). Electrical signals from the photodiode array 38 are fed to the motor 28 for control thereof through wires 39.

The batteries 30 are rechargeable, and they are recharged by electricity from a photovoltaic recharger 40 which produces a recharging voltage from a photovoltaic device located in the recharger 40. The photovoltaic device in the recharger 40 receives light energy through optical waveguide 42. More specifically, the light energy produced by light source 44, located outside the chamber 14, is conveyed through the optical waveguide 42, passing through the cathode base 9, to the photovoltaic device in the recharger 40. The light from the light source 44 may be highly focused into the optical waveguide 42 in order to obtain maximum charging voltage. The voltage generated by recharger 40 for recharging the batteries 30 is conducted to the batteries 30 through electrical conductors 46.

In accordance with another aspect of the invention, as shown in FIG. 1, means are provided for conveying anode-cathode gap adjustment information from inside to outside the chamber 14. More specifically, the motor 28 drives a second shaft 48 when the motor 28 turns. Shaft 48 is coupled by coupler 50 to a variable resistor 52 which, in turn, is electrically connected by wires 53 to electrical-signal-to-optical-signal converter 54. As the motor 28 rotates to adjust the anode-cathode gap 12, the variable resistor 52 varies the electrical signal fed to the electrical-signal-to-optical-signal converter 54. Light from electrical-signal-to-optical-signal converter 54 is representative of the size of the anode-cathode gap 12 and is conveyed by optical waveguide 56 through cathode base 9 to gap readout device 58 located outside the chamber 14. The gap readout device 58 provides a display of the size of the anode-cathode gap 12. By observing the size of the anode-cathode gap 12, the motor 28 can be carefully controlled to provide the size of the gap 12 that is desired.

Figure 2:
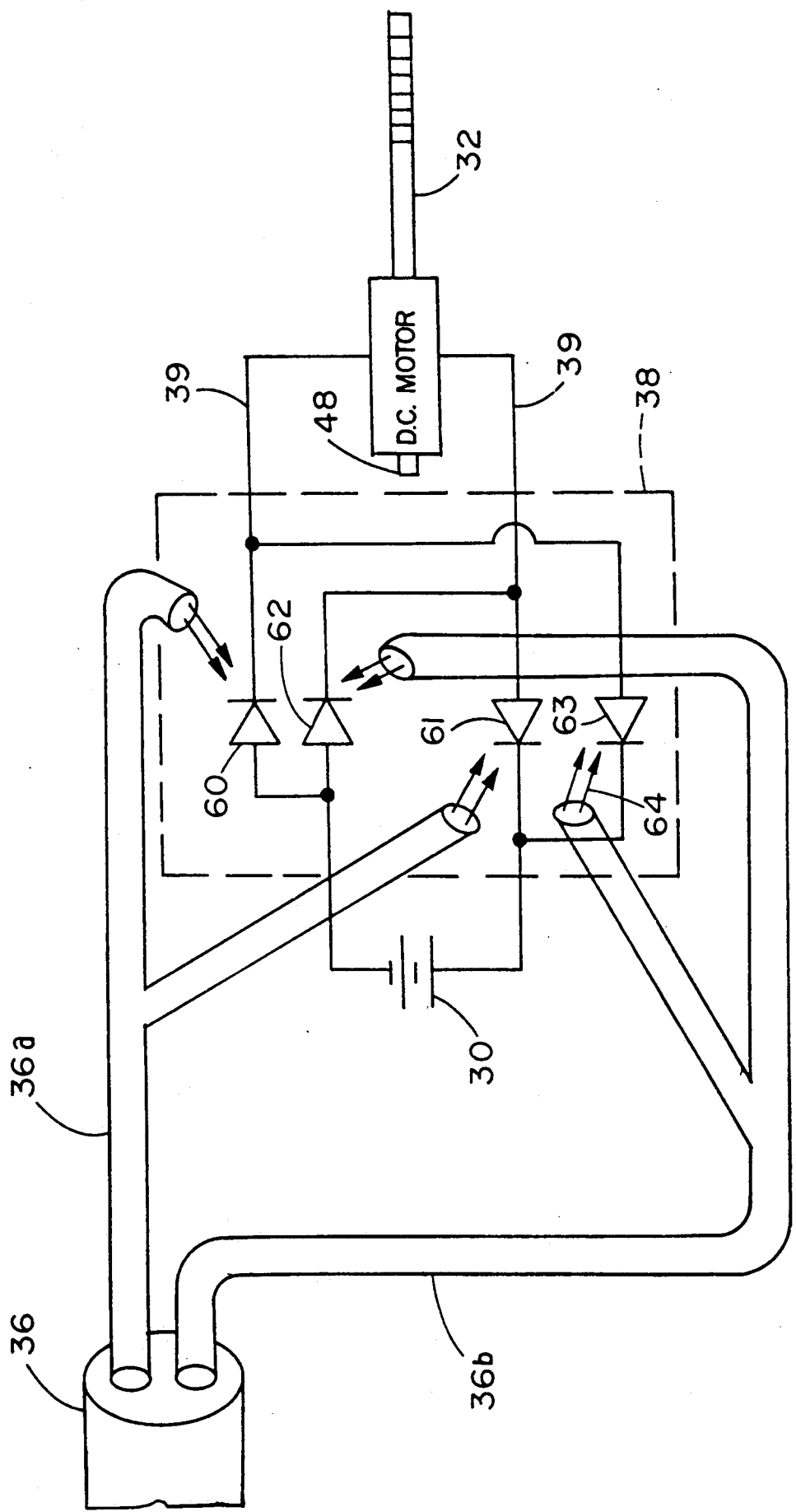
FIG. 2 is an electrical schematic diagram for an array of switching photodiodes for driving the electric motor.

Referring to FIG. 2, the photodiode array 38 of FIG. 1 is shown in greater detail. The photodiode array 38 includes a first set of photodiodes 60 and 61 which are responsive to light from bifurcated ends of optical waveguide 36a. The photodiode array 38 also includes a second set of photodiodes 62 and 63 which are responsive to light from bifurcated ends of optical waveguide 36b. The respective diodes 60-63 are connected together to form a means for reversing the polarity of the DC voltage applied to the DC motor 28. When light, as indicated by arrows 64, emerges from optical waveguide 36a and falls upon photodiodes 60 and 61, the polarity of DC voltage from the battery 30 supplied to the motor 28 will drive the motor 28 in one direction. On the other hand, when light emerges from optical waveguide 36b and falls upon photodiodes 62 and 63, the polarity of the DC voltage from the battery that is supplied to the motor 28 is reversed and will drive the motor 28 in the reverse direction. In this way, the direction of the motor 28 for controlling the anode-cathode gap 12 inside the chamber 14 is controlled by light input from outside the chamber 14.

Figure 3:
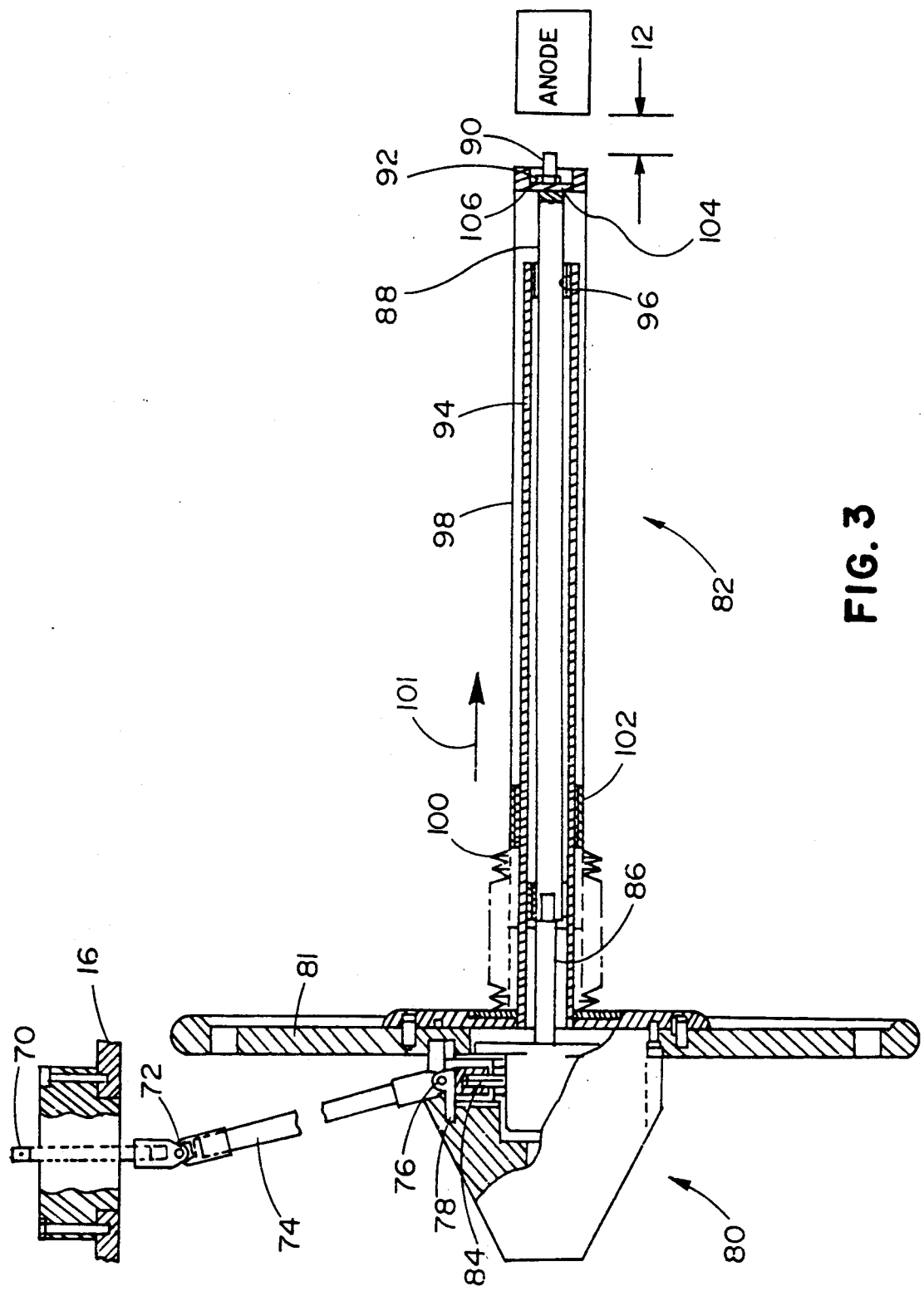
FIG. 3 is a longitudinal cross-sectional view of an embodiment of the invention in which the anode-cathode gap is adjusted by manually-operated mechanical means.

Referring to FIG. 3, an embodiment of the invention is shown in which the anode-cathode gap 12 is controlled by manually operated mechanical means. More specifically, input control is brought about by manually operated handle 70. The handle 70 is connected to a mechanical linkage which includes a first universal joint 72 on one end of a drive shaft 74, the drive shaft 74, and a second universal joint 76 located at the other end of the drive shaft 74. The second universal joint 76 is connected to a rotatable cam 78. As the handle 70 is rotated, the universal joints 72 and 76, the drive shaft 74, and the cam 78 are rotated.

A jack assembly 80 is combined with a hollow cathode assembly 82. The jack assembly 80 and the hollow cathode assembly 82 are supported by either a wall of the vacuum chamber or a fixture 81 located inside the vacuum chamber 14. When the rotatable cam 78 is rotated, the cam 78 engages key 84 of the jack assembly. In so doing, the key 84 converts the rotational motion of the cam 78 into linear motion of jack shaft 86 which is connected to the key 84. When the jack shaft 86 moves linearly in response to rotation of the cam 78, the shaft 86 moves the hollow cathode assembly 82 linearly, whereby the anode-cathode gap 12 is adjusted.

More specifically, shaft 86 is connected to extension 88. At the far end of the extension 88, a cathode tip 90 is located. The cathode tip 90 is supported by a screw portion at the far end of the extension 88. A nut 92 is fastened to the screw portion at the far end of the extension 88. The extension 88 passes through the length of an inner cylindrical housing 94 and rides on bearings 96 positioned between the extension 88 and the housing 94.

At the far end of the extension 88, very near the cathode tip 90, the nut 92 secures an outer housing 98 onto the extension 88. Moreover, the outer housing 98 includes bellows 100 which expands as the extension 88 is moved away from the jack assembly 80 (in the direction of arrow 101) and contracts when the extension is moved toward the jack assembly 80. The outer housing 98 is supported by the inner housing 94 by bearing 102.

In operation, when handle 70 is rotated in one direction, the jack shaft 86 is moved in the direction of arrow 101, and the size of the anode-cathode gap 12 is reduced. The extension 88 is moved in the same direction as the jack shaft 86 while sliding on bearings 96. Similarly, the far end 104 of the extension 88 is pushed up against the end wall 106 of the outer housing 98, whereby the outer housing 98 is also moved in the direction of the arrow 101, and the bellows 100 are expanded. On the other hand, when the handle 70 is rotated in the opposite direction, the jack shaft 86, the extension 88, and the outer housing 98 are moved the opposite direction to increase the size of the anode-cathode gap 12.

In summary, numerous benefits have been described which result from employing the principles of the invention. With the invention, an anode-cathode gap for a pulse power machine is adjusted by remote control, whereby disassembly of the vacuum chamber in order to bring about an adjustment of the anode-cathode gap is not required. Also, by employing the invention, the hollow cathode houses a motor and associated circuitry for adjusting the anode-cathode gap in a pulse power machine, whereby the motor and associated circuitry are protected from the electromagnetic energy of the pulse power machine. In addition, optical waveguides are employed to convey input control information into the hollow cathode and to bring information about the status of the anode-cathode gap out of the hollow cathode. The optical waveguides are not susceptible to interference from electromagnetic pulse energy from the pulse power machine. With the invention, rechargeable batteries can be recharged remotely, whereby the need to disassemble the apparatus to change run down batteries is substantially reduced.

The foregoing description of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. An apparatus for adjusting an anode-cathode gap between an anode and a cathode in a pulse power machine, wherein the cathode is hollow and housed in a chamber that has a chamber wall which serves as the anode at one end and a cathode base for supporting the cathode at the opposite end, said cathode base insulated from said anode, said apparatus comprising:
   means within the cathode inside the chamber for adjusting the anode-cathode gape,
   means within the cathode inside the chamber connected to said anode-cathode gap adjusting means, for conveying control input from outside the chamber, through the cathode base, to said anode-cathode gap adjusting means inside the cathode located inside the chamber, and
   means, outside the chamber, in communication with said control input conveying means, for applying control input to said anode-cathode gap adjusting means inside the chamber.

2. The apparatus described in claim 1 wherein said control input is in the form of optical signals.

3. The apparatus described in claim 1 wherein said control input is in the form of mechanical movement.

4. The apparatus described in claim 1 wherein said anode-cathode gap adjusting means includes:
   means for holding a cathode tip,
   a movable support for said cathode tip holding means, said support capable of moving said cathode tip holding means toward or away from the anode,
   a hollow cathode including an end adapted to receive said movable support, said hollow cathode supported inside the chamber,
   electric driving means, housed within said hollow cathode, for moving said movable support, whereby the anode-cathode gap is adjusted, said electric driving means connected to said control input conveying means, and
   a power source, housed within said hollow cathode, for powering said electric driving means.

5. The apparatus described in claim 4, further including:
   means, inside the cathode, for reenergizing said power source, and
   means, in communication with said power source reenergizing means, for conveying reenergizing energy from outside the chamber, through the cathode base, to inside the hollow cathode located within the chamber.

6. The apparatus described in claim 5 wherein:
   said power source includes rechargeable batteries, and
   said means for reenergizing said power source includes a photovoltaic cell that recharges the batteries when said photovoltaic cell receives light energy through an optical waveguide from outside the chamber through the cathode base.

7. The apparatus described in claim 1, further including:
means, connected to said anode-cathode gap adjusting means, for providing anode-cathode gap adjustment information inside the chamber, and
means, in communication with said gap adjustment information means, for conveying the gap adjustment information from inside the cathode, through the cathode base, to outside the chamber.

8. The apparatus described in claim 7 wherein:
said gap information providing means includes,
means, responsive to movement associated with said anode-cathode gap adjusting means, for providing an electrical signal representative of said movement, and
means for receiving said representative electrical signal and providing an optical signal in response to said electrical signal, and
said means for conveying gap adjustment information includes, an optical waveguide in communication with said optical signal providing means, said optical waveguide passing from inside the cathode, through the cathode base to outside the chamber.

9. The apparatus described in claim 1 wherein:
said means, outside the chamber, for controlling said anode-cathode gap adjusting means, inside the chamber, includes means for generating optical control signals,
said means for conveying control input from outside the chamber to inside the chamber includes optical waveguides, and
said means for adjusting the anode-cathode gap includes means for converting optical signals to electrical signals.

10. An apparatus for adjusting an anode-cathode gap between an anode and a cathode in a pulse power machine, wherein the cathode is housed in a chamber which has a chamber wall which serves as the anode and a cathode base at one end thereof and insulated therefrom for supporting the cathode, said apparatus comprising:
means, inside the chamber, for adjusting the anode-cathode gap, said anode-cathode gap adjusting means including,
means for holding a cathode tip,
a movable support for said cathode tip holding means, said support capable of moving said cathode tip holding means toward or away from the anode,
a hollow cathode including an end adapted to receive said movable support, said hollow cathode supported inside the chamber by said cathode base;
electric driving means, housed within said hollow cathode, for moving said movable support, whereby the anode-cathode gap is adjusted, said electric driving means connected to said control input conveying means, and
a power source, housed within said hollow cathode, for powering said electric driving means,
means, connected to said anode-cathode gap adjusting means, for conveying control input from outside the chamber, through the chamber wall, to said anode-cathode gap adjusting means inside the chamber, said conveying means including optical waveguides,
means, outside the chamber, in communication with said control input conveying means, for controlling the anode-cathode gap adjusting means inside the chamber, said controlling means including means for generating optical control signals conveyed by said waveguides,
means, connected to said anode-cathode gap adjusting means, for providing anode-cathode gap adjustment information inside the chamber, said adjusting means including means for converting optical signals to electrical signals, and
means, in communication with said gap adjustment information means, for conveying the gap adjustment information from inside the cathode, through the cathode base, to outside the chamber.

11. An apparatus for adjusting an anode-cathode gap between an anode and a cathode in a pulse power machine, wherein the cathode is housed in a chamber which has a chamber wall which serves as the anode and a cathode base at one end thereof and insulated therefrom for supporting the cathode, said apparatus comprising:
means, inside the chamber, for adjusting the anode-cathode gap, said anode-cathode gap adjusting means including,
means for holding a cathode tip,
a movable support for said cathode tip holding means, said support capable of moving said cathode tip holding means toward or away from the anode,
a hollow cathode including an end adapted to receive said movable support, said hollow cathode supported inside the chamber by said cathode base,
electric driving means, housed within said hollow cathode, for moving said movable support, whereby the anode-cathode gap is adjusted, said electric driving means connected to said control input conveying means, and
a power source, housed within said hollow cathode, for powering said electric driving means
means, connected to said anode-cathode gap adjusting means, for conveying control input from outside the chamber, through said cathode base, to said anode-cathode gap adjusting means inside the chamber, said conveying means including optical waveguides, means, outside the chamber, in communication with said control input conveying means, for controlling the anode-cathode gap adjusting means inside the chamber, said controlling means including means for generating optical control signals conveyed by said waveguides,
means, connected to said anode-cathode gap adjusting means, for providing anode-cathode gap adjustment information inside the chamber, said adjusting means including means for converting optical signals to electrical signals,
means, in communication with said gap adjustment information means, for conveying the gap adjustment information from inside the chamber, through said cathode base, to outside the chamber,
means, connected to said anode-cathode gap adjusting means, for providing anode-cathode gap adjustment information inside the chamber, wherein said gap information providing means includes,
means, responsive to movement associated with said anode-cathode gap adjusting means, for providing an electrical signal representative of said movement, and means for receiving said representative electrical signal and providing an optical signal in response to said electrical signal, and means, in communication with said gap adjustment information means, for conveying the gap adjustment information from inside the chamber, through said cathode base, to outside the chamber, wherein said means for conveying gap adjustment information includes an optical waveguide in communication said optical signal providing means, said optical waveguide passing through the chamber wall to outside the chamber.

12. The apparatus described in claim 11 wherein:

said electric driving means is controlled to move the cathode toward the anode by first optical signals from outside the chamber conveyed through a first optical waveguide to a first set of photodiodes in an array for current rectification inside the chamber, whereby the electric driving means moves the cathode toward the anode, when receiving optical signals through the first set of voltage reversing photodiodes in said array, and said electric driving means is controlled to move the cathode away from the anode by second optical signals from outside the chamber conveyed through a second optical waveguide to a second set of photodiodes in said array inside the chamber, whereby the electric driving means moves the cathode away from the anode, when receiving optical signals through the second set of voltage reversing photodiodes in said array.

13. The apparatus described in claim 1 wherein:

said means, outside the chamber, for applying control input to said anode-cathode gap adjusting means inside the chamber, includes mechanical input control means, said means for conveying control input from said mechanical input control means to said gap adjusting means inside the chamber includes mechanical linkage means, and said means for adjusting the anode-cathode gap through said mechanical linkage means includes mechanical cathode moving means.

14. The apparatus described in claim 13 wherein:

said mechanical input control means includes a manually operated rotatable handle, said mechanical linkage means, connected to said rotatable handle, includes,
 a rotatable drive shaft including a first universal joint at a first end connected to said handle, and a second universal joint at a second end, and
 a rotatable cam connected to said second universal joint, and said mechanical cathode moving means includes a jack assembly for converting the rotational motion of said cam to linear motion for adjusting the anode-cathode gap.

15. The apparatus described in claim 14 wherein said jack assembly includes a key that engages said rotating cam and moves linearly in response to the rotation of said cam.

16. An apparatus for adjusting an anode-cathode gap between an anode and a cathode in a pulse power machine, wherein the cathode is hollow and housed in a chamber that has a chamber wall which serves as the anode at one end and a cathode base for supporting the cathode at the opposite end, said cathode base insulated from said anode, said apparatus comprising:

means within the cathode inside the chamber for adjusting the anode-cathode gap, said anode-cathode adjusting means further comprising a means for holding a cathode tip, a movable support mounted within an end of said hollow cathode adapted to receive said movable support, said support for said cathode tip holding means and capable of moving said cathode tip holding means toward or away from the anode, electric driving means housed within said hollow cathode for moving said movable support whereby the anode-cathode gap is adjusted, and a power source housed within said hollow cathode for powering said electric driving means;

means within the housing inside the chamber connected to said electric driving means of said anode-cathode gap adjusting means, for conveying control input from outside the chamber, through the cathode base, to said anode-cathode gap adjusting means inside the cathode located inside the chamber; and means, outside the chamber, in communication with said control input conveying means, for applying control input to said anode-cathode gap adjusting means inside the chamber.

17. The apparatus described in claim 16, further comprising:

means within said cathode for reenergizing said power source; and means, in communication with said power source reenergizing means, for conveying reenergizing energy from outside the chamber through the cathode base to inside the hollow cathode located within the chamber.

18. The apparatus described in claim 17, wherein:

said power source includes rechargeable batteries; and said means for reenergizing said power source includes a photovoltaic cell that recharges the batteries when said photovoltaic cell receives light energy through an optical waveguide from outside the chamber through the cathode base.

* * * * *